United States Patent
Deo (10) Patent No.: US 6,810,524 B2
(45) Date of Patent: Oct. 26, 2004

(54) DISK CHANGER

(75) Inventor: Hisao Deo, Daito (JP)

(73) Assignee: Funai Electric Co., Ltd., Daito (JP)

( * ) Notice: Subject to any disclaimer, the term of this patent is extended or adjusted under 35 U.S.C. 154(b) by 231 days.

(21) Appl. No.: 10/103,105

(22) Filed: Mar. 22, 2002

(65) Prior Publication Data

US 2002/0136102 A1 Sep. 26, 2002

(30) Foreign Application Priority Data

Mar. 23, 2001 (JP) .......................................... 2001-085538

(51) Int. Cl.⁷ .............................................. G11B 17/24
(52) U.S. Cl. ................. 720/606; 369/30.97; 369/30.96; 369/30.8
(58) Field of Search .......................... 369/30.79, 30.86, 369/30.8, 30.91, 30.93, 30.94, 30.95, 30.96, 30.97, 30.98; 720/600, 601, 606

(56) References Cited

U.S. PATENT DOCUMENTS

| | | | | |
|---|---|---|---|---|
| 5,555,227 A | * | 9/1996 | Kurosu | 369/30.96 |
| 5,742,571 A | * | 4/1998 | Hoshino et al. | 369/30.98 |
| 5,771,213 A | * | 6/1998 | Koshino et al. | 369/30.91 |

FOREIGN PATENT DOCUMENTS

| | | |
|---|---|---|
| JP | 49-36916 | 8/1947 |
| JP | 62-289960 | 12/1987 |
| JP | 4-302848 | 10/1992 |
| JP | 6-77051 | 10/1994 |
| JP | 08-017125 | 1/1996 |
| JP | 10-049958 | 2/1998 |

OTHER PUBLICATIONS

Japanese Office Action.

* cited by examiner

*Primary Examiner*—David Ometz
(74) *Attorney, Agent, or Firm*—Crowell & Moring LLP (57) ABSTRACT

When a disk tray stops beyond or before a predetermined rotational position, there has heretofore been a likelihood of the disk tray being unable to be inhibited its rotation. As an arm portion 261b is displaced counterclockwise, a shaft portion 262b of a rotary stopper 262 moves toward an engaging groove 223, so that a sharp portion 262a1 is inserted into the engaging groove 223. At this time, slant faces formed on both sides of the tip of the sharp portion are guided along slant faces of the engaging groove 223 and are inserted to an inner part of the engaging groove. Thus, even when a rotary tray 220 stops at a position deviated from the predetermined rotational position, it is possible to surely inhibit the rotation of the rotary tray 220.

5 Claims, 13 Drawing Sheets

DISK CHANGER

BACKGROUND OF THE INVENTION

1. Field of the Invention

The present invention relates to a disk changer and more particularly to a disk changer which causes a disk tray with plural disks received therein to rotate up to a predetermined position.

2. Description of the Prior Art

As a conventional disk changer there is known such a disk changer as is disclosed in Japanese Published Unexamined Patent Application No. Hei 4-302848.

In this conventional disk changer, a lever provided at a tip thereof with an upwardly projecting, arcuate, rotation inhibiting piece is disposed in a rotation inhibiting mechanism, while an inner peripheral wall erected downward on a circumference centered on a rotational axis of a disk tray and with cutout portions formed at angular intervals of 90° is formed on a back side of the disk tray.

According to this construction, when the disk tray stops at a predetermined rotational position, the rotation inhibiting piece of the lever is moved into any of the cutout portions and is thereby rendered interferable with the above inner peripheral surface to inhibit the rotation of the disk tray.

In the above conventional disk changer, if the disk tray stops beyond or before the predetermined rotational position, it is impossible to let any of the cutout portions confront the rotation inhibiting piece, so that the rotation inhibiting piece cannot be moved into any of the cutout portions and hence it is impossible to inhibit the rotation of the disk tray.

SUMMARY OF THE INVENTION

The present invention has been accomplished in view of the above-mentioned problem and it is an object of the invention to provide a disk changer which can be sure to inhibit the rotation of a disk tray.

According to the present invention, for achieving the above-mentioned object, there is provided a disk changer comprising:

a slide tray with a support shaft erected on an upper surface thereof, the slide tray being installed so that it can be drawn out from a cabinet body;

a disk tray having on an upper surface thereof a plurality of disk receptacle portions which can receive disks therein, the disk tray having on a lower surface thereof an engaging groove which has wedge-like slant faces radially, the disk tray having an axis at which it is supported rotatably by the support shaft of the slide tray;

a chuck arm having one end mounted to an upper end of the support shaft of the slide tray and having on an opposite end side thereof a first chucking portion which can confront each of the disk receptacle portions from above;

a drive unit for rotating the disk tray;

a position sensor for detecting a rotational position of the disk tray;

a mechanical holder which carries thereon a second chucking portion and a pickup both able to confront each of the disk receptacle portions from below, the mechanical holder being able to let the second chucking portion and the pickup move toward and away from each of the disk receptacle portions on a lower surface of the slide tray;

a lock mechanism provided with a rotary stopper, the rotary stopper having at one end thereof a sharp portion capable of being inserted into the engaging groove of the disk tray; and a motion gear which, when the rotation of the disk tray by the drive unit is stopped at a predetermined rotational position detected by the position sensor, causes the sharp portion of the rotary stopper in the lock mechanism to be inserted into the engaging groove to inhibit the rotation of the disk tray, the motion gear causing the second chucking portion and the pickup in the mechanical holder to rise toward the associated disk receptacle portion, allowing a rotational axis of the disk received therein to be held between the first and second chucking portions.

In the present invention constructed as above, the slide tray is installed so that it can be drawn out from a cabinet body, and the disk tray provided with plural disk receptacle portions on an upper surface thereof has an axis at which it is supported rotatably by a support shaft erected on an upper surface of the slide tray.

One end of a chuck arm, which is provided on an opposite end side thereof with a first chucking portion able to confront each of the disk receptacle portions from above, is mounted to an upper end of the support shaft.

According to this construction, when the rotation of the disk tray by the drive unit is stopped at the predetermined rotational position detected by the position sensor during chucking, the motion gear causes the sharp portion of the rotary stopper to be inserted into the engaging groove, the engaging groove being formed in a lower surface of the disk tray and having wedge-like slant faces radially, thereby inhibiting the rotation of the disk tray.

The motion gear causes the second chucking portion and the pickup carried on the mechanical holder to rise toward any of the disk receptacle portions, allowing a rotating shaft of the disk received therein to be held between the first and second chucking portions.

Thus, according to the present invention, a disk changer able to positively inhibit the rotation of the disk tray can be realized by a concrete construction.

Although the present invention is thus realized as a disk changer having a concrete construction, such a construction is a mere example and hence the technique contemplated by the present invention can be grasped in a wide scope.

More specifically, the present invention may be realized in terms of a disk changer comprising a disk tray of a generally disk shape, the disk tray being able to receive plural disks on a surface thereof and having an engaging groove in a position spaced apart from a rotational axis thereof, the engaging groove having wedge-like slant faces radially, a drive mechanism for rotating the disk tray, and a rotation inhibiting mechanism which causes a sharp portion of an engaging member thereof to be inserted into the engaging groove of the disk tray radially to inhibit the rotation of the disk tray.

In this construction, the drive mechanism rotates the disk tray which can receive plural disks on a surface thereof.

When the rotation of the disk tray is stopped, the rotation inhibiting mechanism causes a sharp portion of its engaging member to be inserted radially into the engaging groove to inhibit the rotation of the disk tray, the engaging groove being formed in the disk tray and having wedge-like slant faces radially in positions spaced apart from a rotational axis of the disk tray.

At this time, in the rotation inhibiting mechanism, slant faces formed on both sides of a tip end of the sharp portion are guided along the slant faces of the engaging groove until reaching the inner part of the engaging groove. Therefore, even if the disk tray stops beyond or before a predetermined rotational position, the sharp portion is inserted into the engaging groove, whereby the rotation of the disk tray is surely inhibited.

In this way it is possible to provide a disk changer which can inhibit the rotation of the disk tray positively.

As a concrete construction example of the engaging grooves as referred to herein there may be adopted a construction wherein the engaging groove is formed wider than the width of the sharp portion of the engaging member in the circumferential direction of the disk tray.

According to this construction, when the sharp portion of the engaging member is inserted into the engaging groove which is formed wider than the width of the sharp portion in the circumferential direction of the disk tray, the engaging groove comes to have slant faces for guiding the sharp portion to the inner part of the engaging groove over a wider range in the circumferential direction of the disk tray.

Consequently even in case of a large deviation of the disk tray stop position from the predetermined rotational position, it becomes possible to let the sharp portion of the engaging member be inserted positively into the engaging groove. Thus improving the shape of the engaging groove permits of a more positive inhibition of the disk tray rotation.

As a construction example for more ensuring the inhibition of the disk tray rotation there may be adopted a construction wherein the engaging groove is formed in the vicinity of a peripheral edge portion of the disk tray.

According to this construction, the sharp portion is inserted into the engaging groove formed near the peripheral edge portion of the disk try and there is performed an engaging motion between the engaging member and the engaging groove.

At this time, the engaging member is engaged with the engaging groove at a position spaced apart radially from the axis of the disk tray, i.e., at a position at which the energy of a rotary motion of the disk tray becomes large. Consequently, it becomes possible to inhibit the rotation of the disk tray in a more positive manner.

Thus forming the engaging groove at an appropriate position permits of a more effective inhibition of the disk tray rotation.

Thus improving the operation timing of the rotation inhibiting mechanism permits of a more effective inhibition of the disk tray rotation.

As an example there may be adopted a construction wherein the sharp portion of the engaging member is formed on one end side of the engaging member and an axis of the engaging member is oriented in the rotational axis direction of the disk tray, the disk tray pivotally supports one end side of a mechanical holder, the mechanical holder having a pickup able to confront each of the disks received on the disk tray, and there is provided a rotary cam, the rotary cam having a first cam groove into which an opposite end side of the engaging member is inserted and which causes the opposite end side of the engaging member to move forward and backward radially of the disk tray and a second cam groove into which an opposite end side of the mechanical holder is inserted and which causes the opposite end side of the mechanical holder to move up and down with respect to a rotational surface of the disk tray, the rotary cam, when rotating in a predetermined direction, causing the opposite end side of the engaging member to be guided and rotated by the first cam groove in a direction in which the sharp portion of the engaging member approaches the engaging groove, while causing the opposite end side of the mechanical holder to be moved by the second cam groove in a direction in which the opposite end side of the mechanical holder approaches the rotational surface of the disk tray.

According to this construction, when the rotary cam rotates in a predetermined direction, the first cam groove guides the opposite end side of the engaging member, thereby causing the engaging member to rotate in the predetermined direction so that the sharp portion of the engaging member approaches the engaging groove and is inserted therein, whereby the rotation of the disk tray is inhibited.

Upon inhibition of the disk tray rotation, the second cam groove makes the opposite end side of the mechanical holder move in a direction in which the opposite end side of the mechanical holder approaches the rotational surface of the disk tray, one end side of the mechanical holder being pivotally supported by the disk tray. Upon this movement, the pickup carried on the mechanical holder confronts the disk, thus making it possible to read data from the disk.

With the disk thus established its position, data can be read from the disk and therefore it becomes possible to effect a more reliable data reading operation.

Thus improving the operation timing of the rotation inhibiting mechanism permits of reading data in a more positive manner.

DESCRIPTION OF THE PREFERRED EMBODIMENTS

Figure 1:
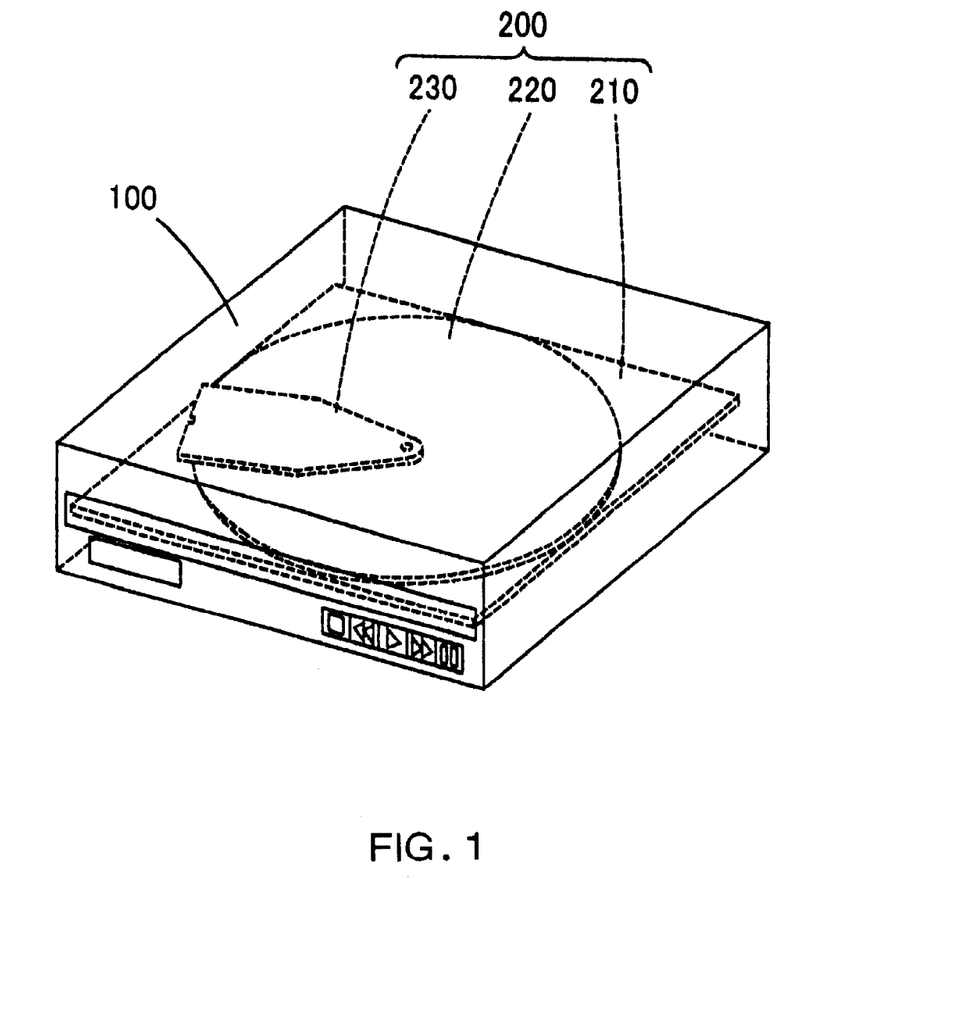
FIG. 1 is a perspective view showing an appearance of a DVD reproducing apparatus associated with an embodiment of the present invention.

Embodiments of the present invention will be described hereinunder with reference to the accompanying drawings and in accordance with the following order:

(1) DVD reproducing apparatus
(2) Disk changer
(3) Motion gear
(4) Lock mechanism
(5) Mechanical holder (1) DVD Reproducing Apparatus FIG. 1 illustrates an appearance of a DVD reproducing apparatus associated with an embodiment of the present invention in terms of a perspective view.

In the same figure, a disk changer 200 is received in a cabinet 100 which is in the shape of a square case. The disk changer 200 is provided with a slide tray 210 which is in the shape of a square plate. A disk-shaped rotary tray 220 is supported rotatably on an upper surface of the slide tray 210, and a chuck arm 230 is attached to an upper surface of the rotary tray 220 at a predetermined position.

On a lower surface of the slide tray 210, though not shown in the same figure, there are mounted a mechanical holder with a pickup, etc. carried thereon, a drive unit for rotating the slide tray 210, a position sensor for detecting a rotational position of the slide tray 210, and a lock mechanism for inhibiting the rotation of the slide tray 210. Further, on an inside bottom of the cabinet 100 is received a control substrate through a shield structure.

The rotary tray 220, the drive unit, and the lock mechanism as referred to here constitute the disk tray, the drive mechanism, and the rotation inhibiting mechanism, respectively, which are defined in the present invention.

(2) Disk Changer

Figure 2:
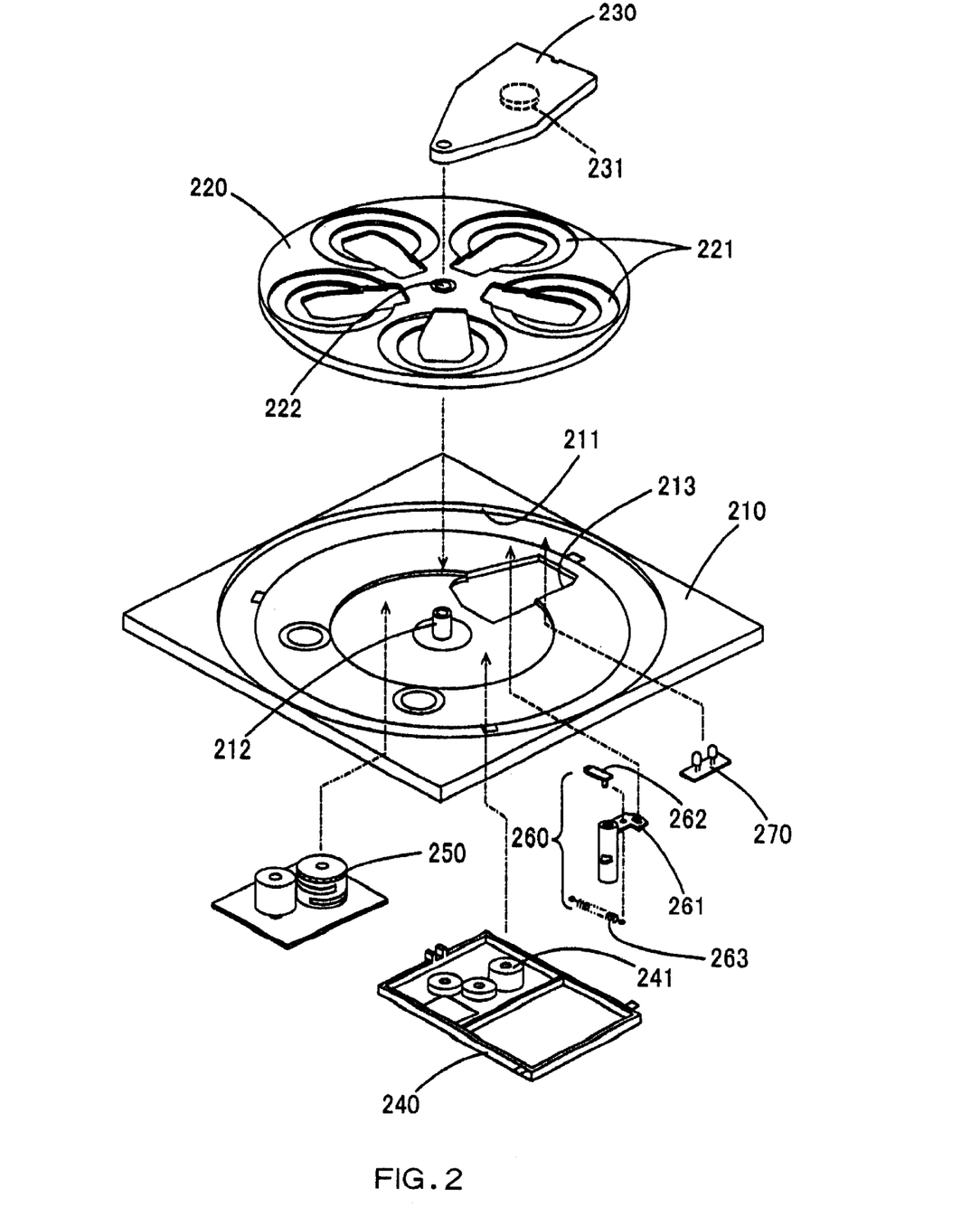
FIG. 2 is an exploded perspective view showing a principal construction of a disk changer embodying the present invention.

FIG. 2 is an exploded perspective view showing a principal construction of the disk changer 200.

The slide tray 210 is installed slidably back and forth within the cabinet 100 so that it can be drawn out through a front panel. A circular recess 211 is formed in an upper surface of the slide tray 210.

Centrally of the slide tray 210 is erected a support shaft 212 vertically upward. The rotary tray 220 is provided on an upper surface thereof with five disk receptacle portions 221 at equal intervals in the circumferential direction. The support shaft 212 is inserted into an axial bore 222 of the rotary tray 220 and the rotary tray is supported rotatably by the recess 211 of the slide tray 210.

One end of the chuck arm 230 is mounted to an upper end of the support shaft 212 so that a first chucking portion 231 provided on an opposite end side of the chuck arm 230 can confront a through hole 213 formed in the slide tray 210.

On the other hand, below the through hole 213 is mounted a mechanical holder 240, the mechanical holder 240 carrying thereon a second chucking portion 241 and a pickup for reading stored data from a disk, the second chucking portion 241 being able to hold a rotational axis of the disk between it and the first chucking portion 231.

The mechanical holder 240 is mounted in such a manner that the second chucking portion 241 and the pickup can move up and down with respect to the through hole 213, and a motion gear 250 which controls the rise/fall timing of the mechanical holder 240 is secured to the lower surface of the slide tray 210 in adjacency to the mechanical holder.

The motion gear 250 not only performs the rise/fall timing of the mechanical holder 240 but also performs an operation timing control for a lock mechanism 260. A stop lever 261, a rotary stopper 262 and a stopper spring 263, which constitute the lock mechanism 260, are mounted to the lower surface of the slide tray 210 in adjacency to the motion gear 250. The motion gear 250 constitutes the rotary cam defined in the present invention.

Further, a position sensor 270 for detecting a rotational position of the rotary tray 220, which position is used as a reference in making the above timing control by the motion gear 250, is mounted to the lower surface of the slide tray 210.

Figure 3:
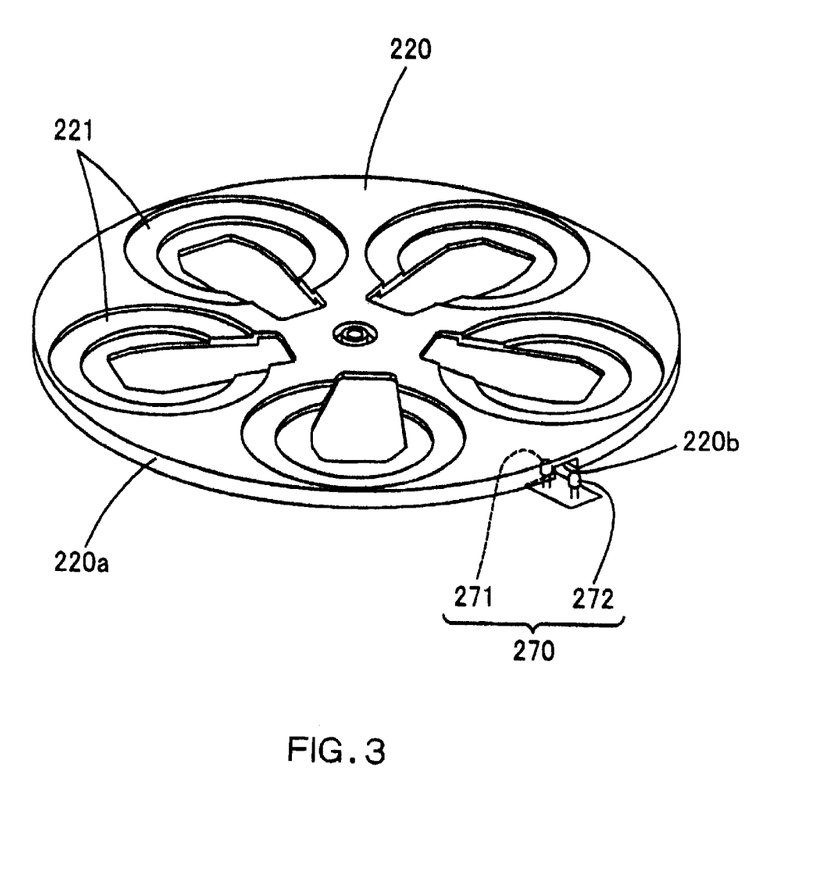
FIG. 3 is a perspective view showing in what state a position sensor detects a rotational position of a rotary tray.

FIG. 3 shows in what state the position sensor 270 detects a rotational position of the rotary tray 220, in terms of a perspective view.

As shown in the same figure, a shield wall 220a is formed downward throughout the whole peripheral edge of the rotary tray 220 and cutout portions 220b are formed at predetermined intervals in the shield wall 220a. In the position sensor 270, an LED 271 is disposed inside the shield wall 220a and at a position opposed to the rotary tray 220, while a photosensor 272 is disposed at a position outside the shield wall 220a.

In this construction, the LED 271 emits light toward the photosensor 272 constantly. As long as the shield wall 220a is present between the LED 271 and the photosensor 272, the emitted light is not received by the photosensor 272. Reception of the light is performed only at a timing at which a cutout portion 220b is interposed between the LED 271 and the photosensor 272. Thus, in the position sensor 270, a rotational position of the rotary tray 220 is detected by detecting whether the light is received or not by the photosensor 272.

(3) Motion Gear

Figure 4:
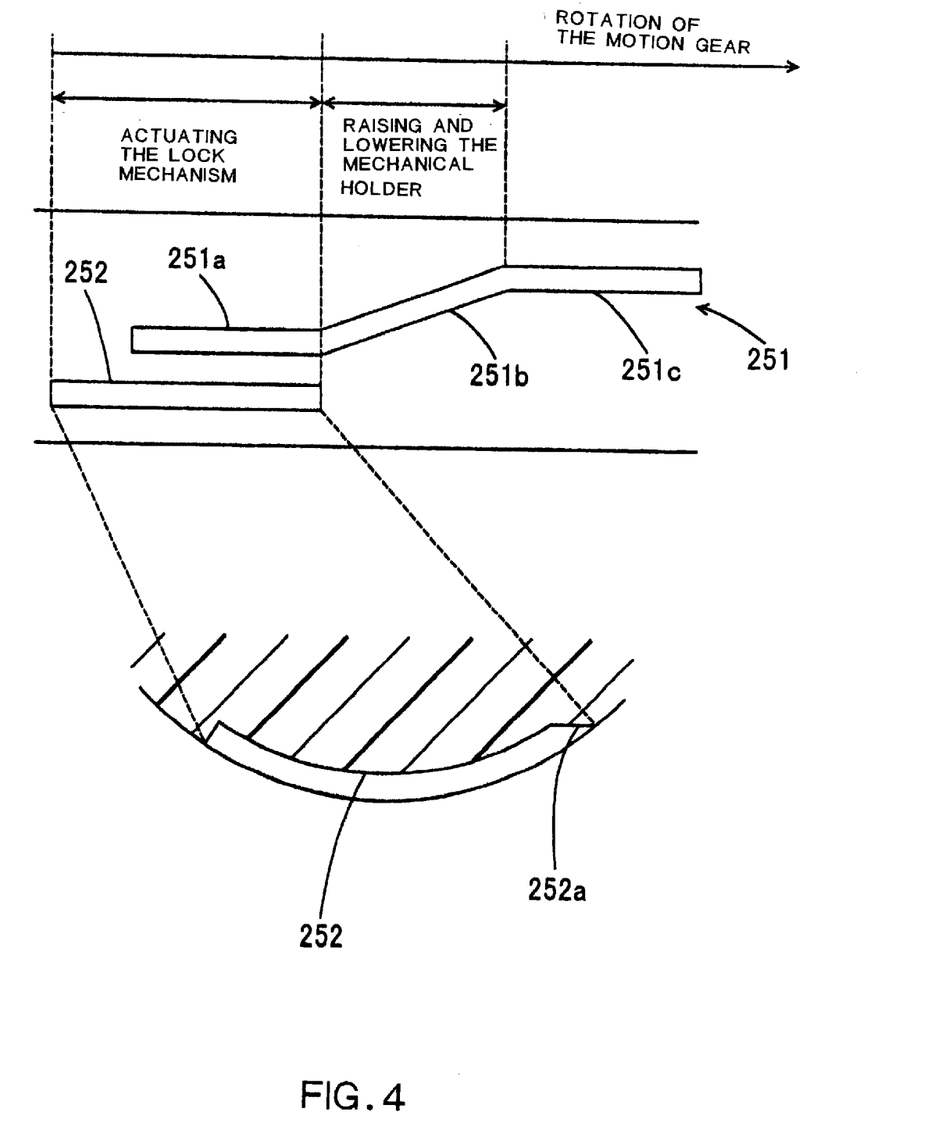
FIG. 4 is a developed view showing a principal construction of cam grooves formed in a peripheral wall surface of a motion gear.

FIG. 4 illustrates a principal construction of cam grooves formed in a peripheral wall surface of the motion gear 250.

In the peripheral wall of the motion gear 250 is formed a cam groove 251 on a side adjacent to the slide tray 210 for raising and lowering the mechanical holder 240, while on a side spaced apart from the slide tray 210 is formed a cam groove 252 for actuating the lock mechanism 260. As shown in the same figure, the cam groove 252 has a slant face 252a at a terminal end, the slant face 252a being extended from the peripheral wall surface of the motion gear.

When chucking the disk, the motion gear 250 rotates clockwise in FIG. 2, thus causing changes of the cam grooves acting from the left to the right side with the lapse of time in FIG. 4.

At the time of chucking, therefore, the mechanical holder 240 is raised toward the slide tray 210 after the lock mechanism 260 is operated to lock and position the rotary tray 220. Conversely, at the time of changing from one disk to another, the mechanical holder 240 is moved down to the side apart from the slide tray 210 and thereafter the lock mechanism 260 is restored to its initial state, permitting rotation of the rotary tray 220.

Consequently, the rotation of the rotary tray 220 is inhibited and a chucking operation is carried out in a positioned state of the rotational axis of the disk which confronts the chuck arm 230 and the mechanical holder 240, thus making it possible to hold the disk positively in the predetermined position.

(4) Lock Mechanism

Figure 5:
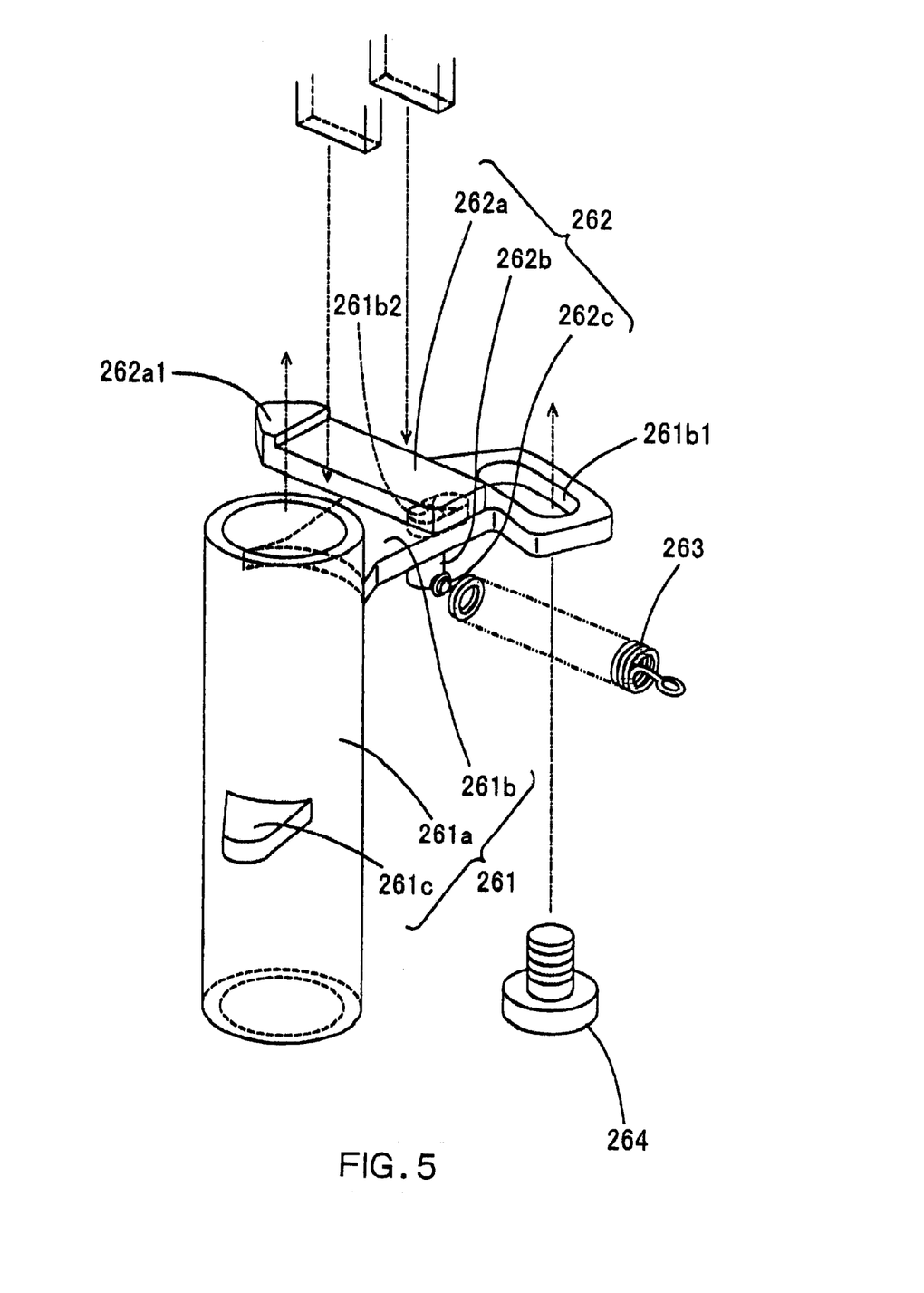
FIG. 5 is a perspective view showing a principal construction of a lock mechanism.

FIG. 5 illustrates a principal construction of the lock mechanism 260 in terms of a perspective view.

In the stopper lever 261, a cylindrical portion 261a is disposed so that an axis thereof is oriented vertically, and from an outer wall on one end side of the cylindrical portion 261a there is extended a band-like arm portion 261b in the horizontal direction. Further, a rib 261c is extended horizontally from the outer wall of the cylindrical portion 261a at a position near a middle part of the cylindrical portion and on the side apart from the arm portion 261b. The cylindrical portion 261a is mounted rotatably to the lower surface of the slide tray 210 and the rib 261c is inserted into the cam groove 252 of the motion gear 250 shown in FIG. 4.

An arcuate guide groove 261b1 is formed on a front end side of the arm portion 261b and on a circumference centered at the cylindrical portion 261a. A guide pin 264 is inserted into the guide groove 261b1 and an upper end thereof is fixed to the lower surface of the slide tray 210. Therefore, when the stop lever 261 rotates, a guide range of the arm portion 261b is restricted by the guide pin 264.

An elongated hole 261b2 which is wide in the longitudinal direction is formed in the arm portion 261b at a position near a middle part of the arm portion, and the rotary stopper 262 is fitted in the elongated hole 261b2. The rotary stopper 262 is provided with a body portion 262a which is disposed so as to be movable forward and backward in the longitudinal direction while being oriented in the horizontal direction. A cylindrical shaft portion 262b is extended vertically downward from one end side of the body portion 262a and is inserted into the elongated hole 261b2. At an opposite end of the body portion 262a is formed a sharp portion 262a1 having a sharp tip, and a mounting portion 262C for the stopper spring 263 is extended from an outer wall of a lower end of the shaft portion 262b on the side apart from the body portion 262a.

One end of the stopper spring 263 is anchored to the mounting portion 262c, while an opposite end of the stopper ring 263 is anchored to the lower surface of the slide tray 210 to urge the rotary stopper 262 toward the mounting portion 262c. In this state, the stopper spring 263 urges the arm portion 261b to this side in FIG. 5.

Figure 6:
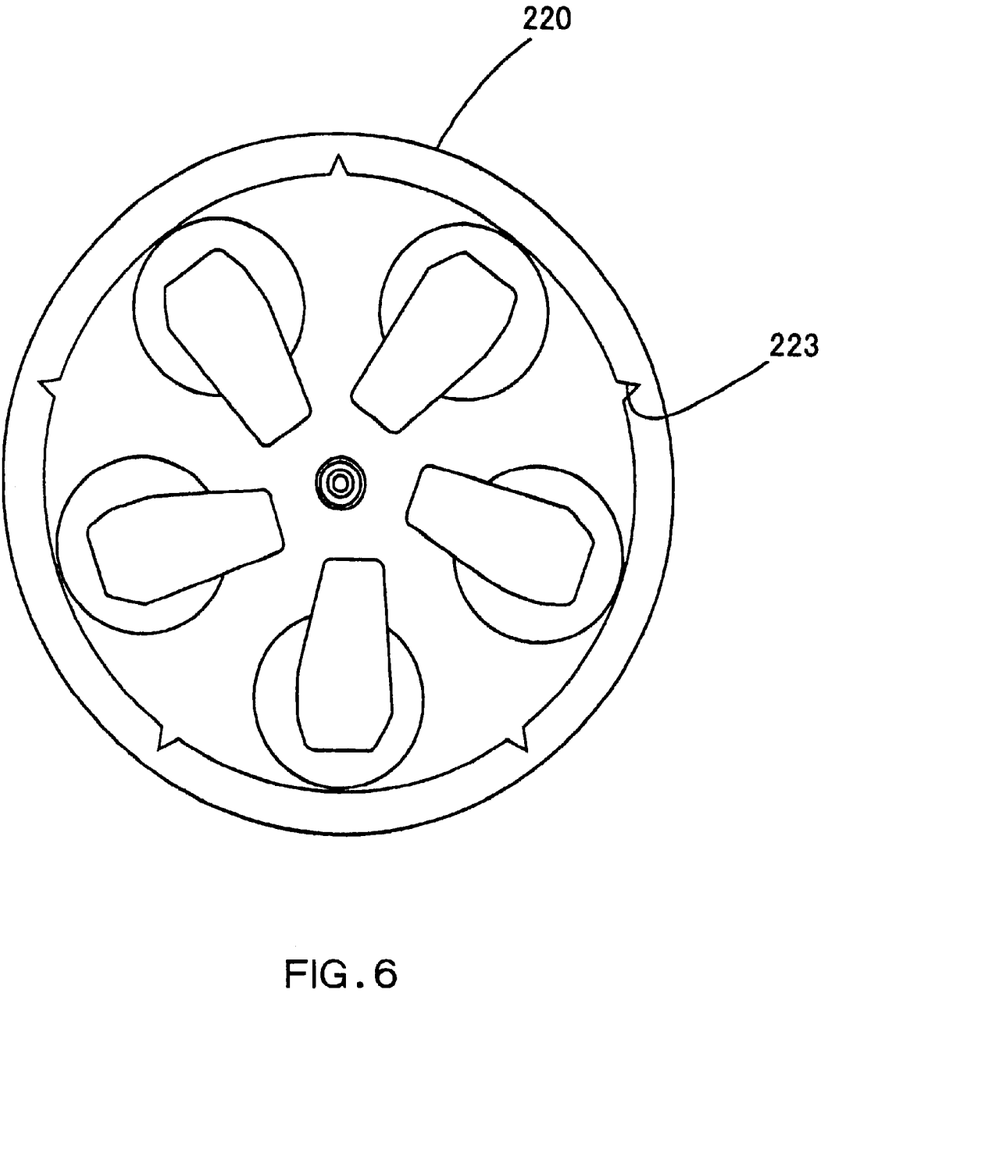
FIG. 6 is a plan view showing a lower surface construction of a rotary tray.

On the other hand, in a lower surface of the rotary tray 220 are formed engaging grooves 223 in five positions at equal intervals in the circumferential direction, as shown in FIG. 6. Each engaging groove 223 has wedge-shaped slant faces radially. The sharp portion 262a1 of the rotary stopper 262 is disposed at a position at which it can confront each engaging groove 223.

Figure 7:
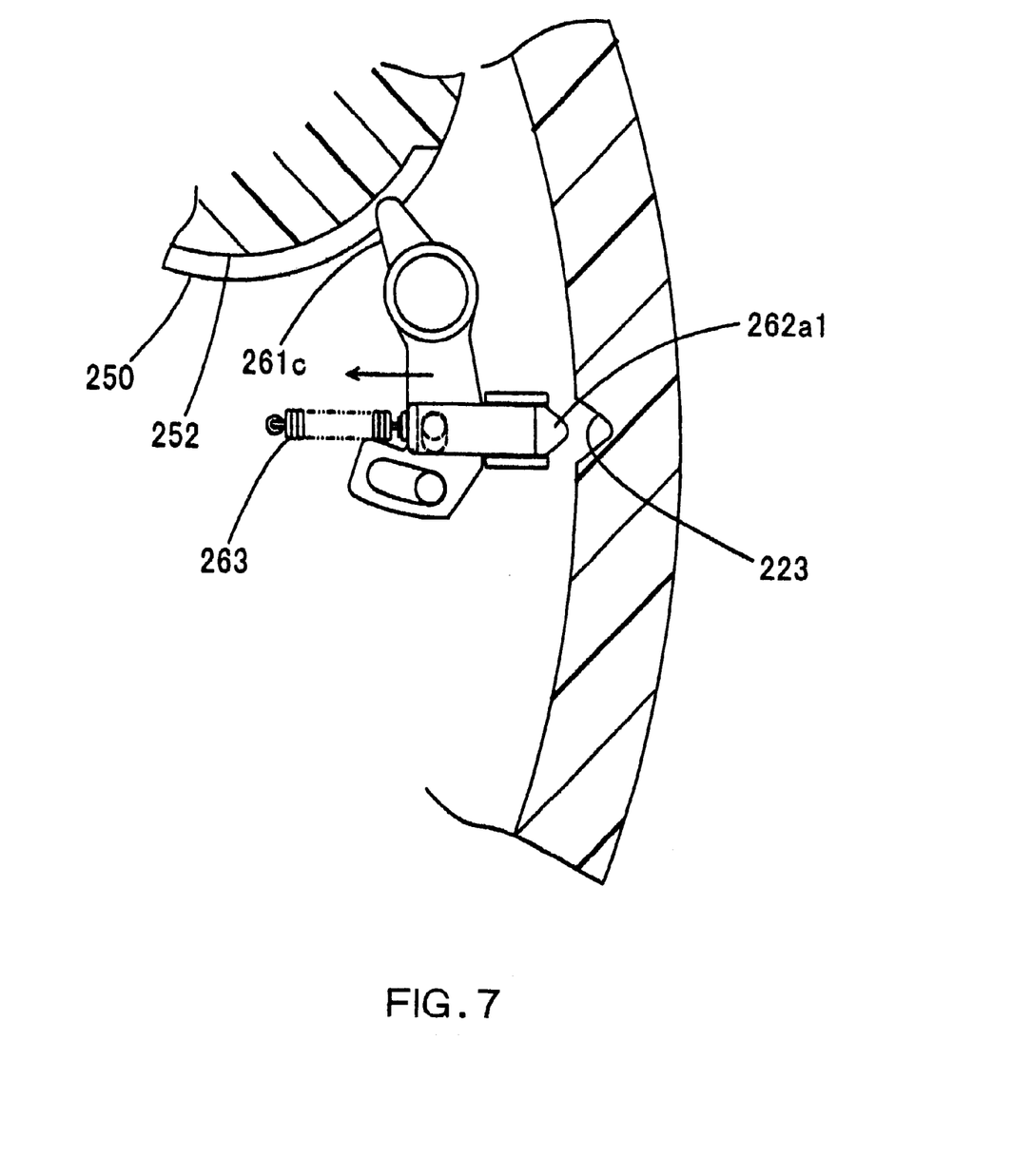
FIG. 7 is a plan view showing an unlocked state.

In such a construction, as shown in FIG. 7, while the rib 261c is inserted into the cam groove 252, the sharp portion 262a1 is urged to the side spaced apart from the associated engaging groove 223 by the stopper spring 263 and is held in this spaced state.

Figure 8:
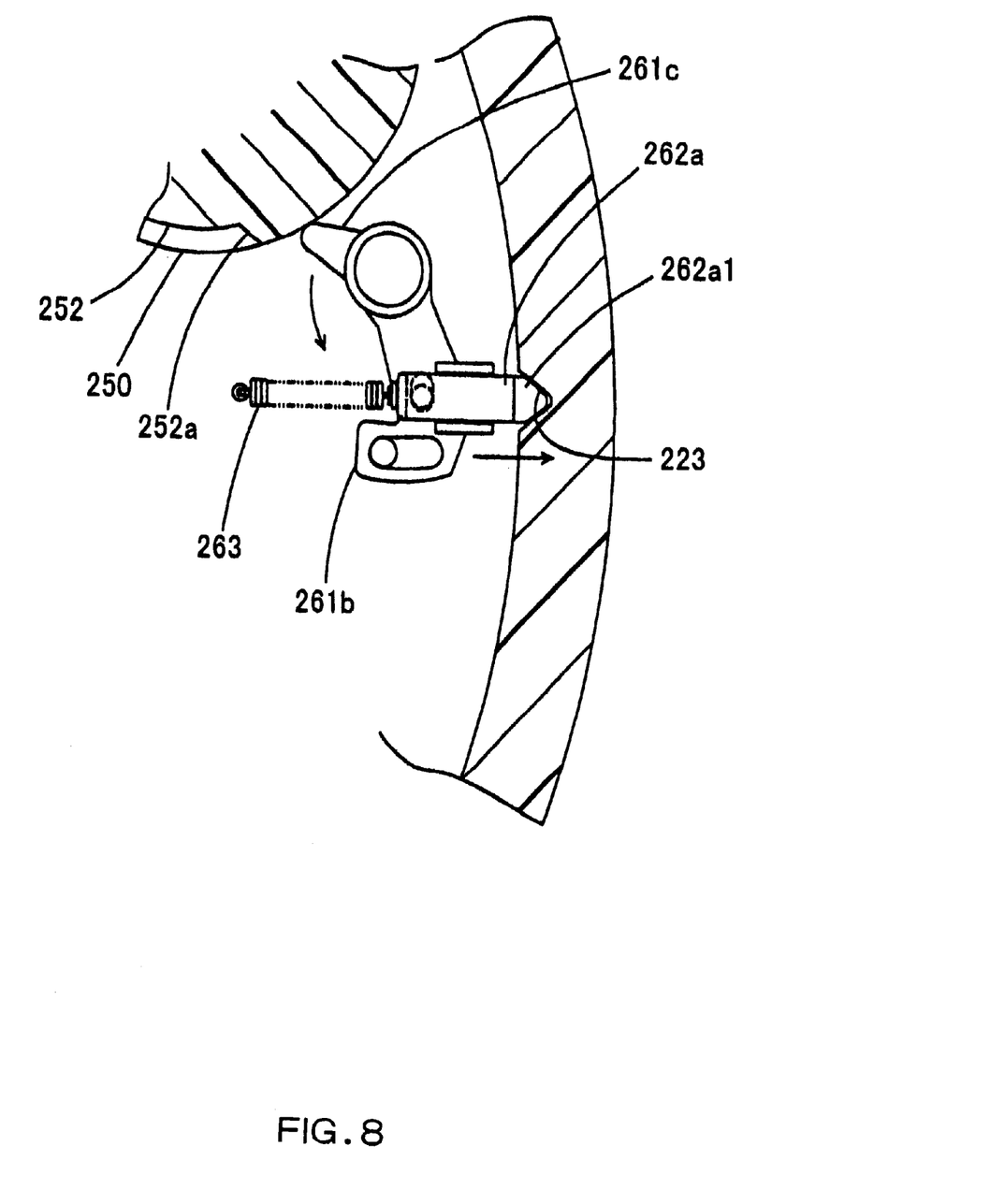
FIG. 8 is a plan view showing a locked state.

When the motion gear 250 turns clockwise, the rib 261c gets on the slant faces 252a, and when the rib 261c begins to be guided by the peripheral wall surface of the motion gear 250, the rib 261c is pressed in a direction away from a rotational axis of the motion gear 250, so that the stopper lever 261 turns counterclockwise, as shown in FIG. 8.

As a result, the shaft portion 262b of the rotary stopper 262 is also displaced counterclockwise together with the arm portion 261b and the sharp portion 262a1 is inserted into the engaging groove 223, thus inhibiting the rotation of the rotary tray 220 to effect positioning.

Figure 9:
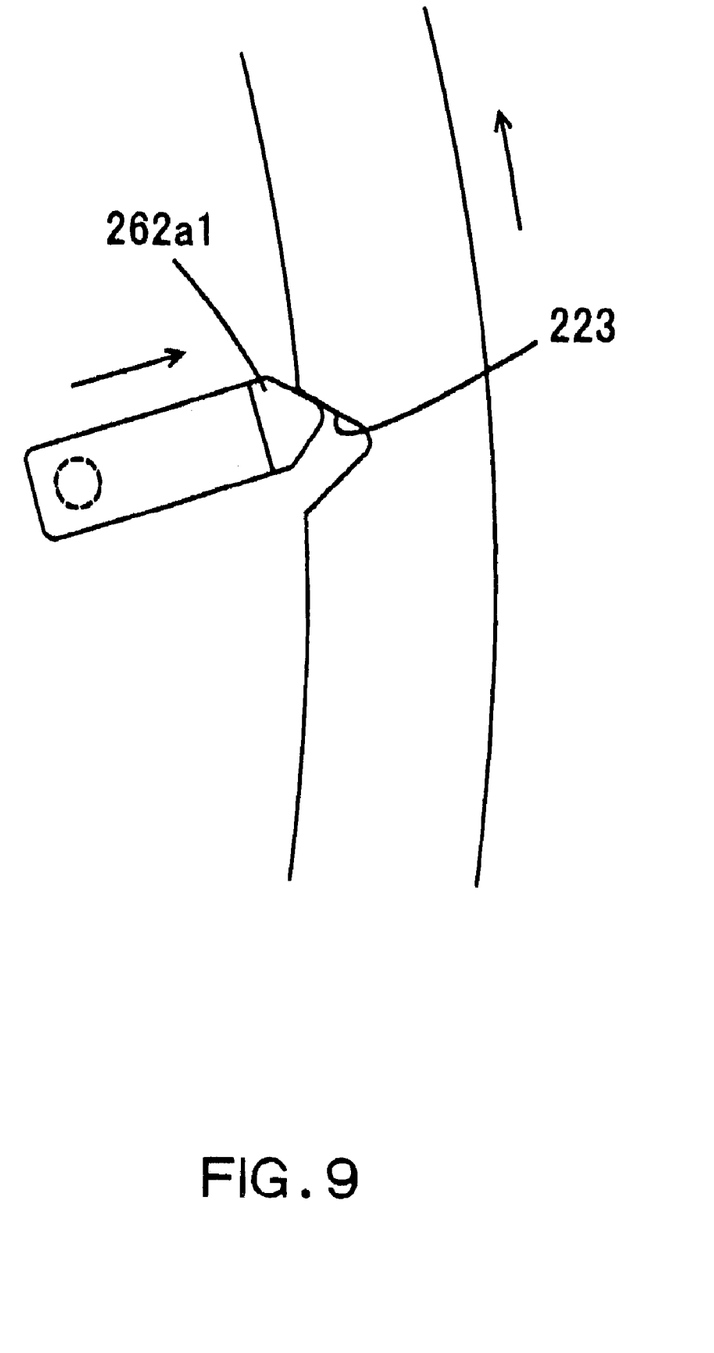
FIG. 9 is a plan view showing a state in which an engaging groove has stopped past a predetermined position.
Figure 10:
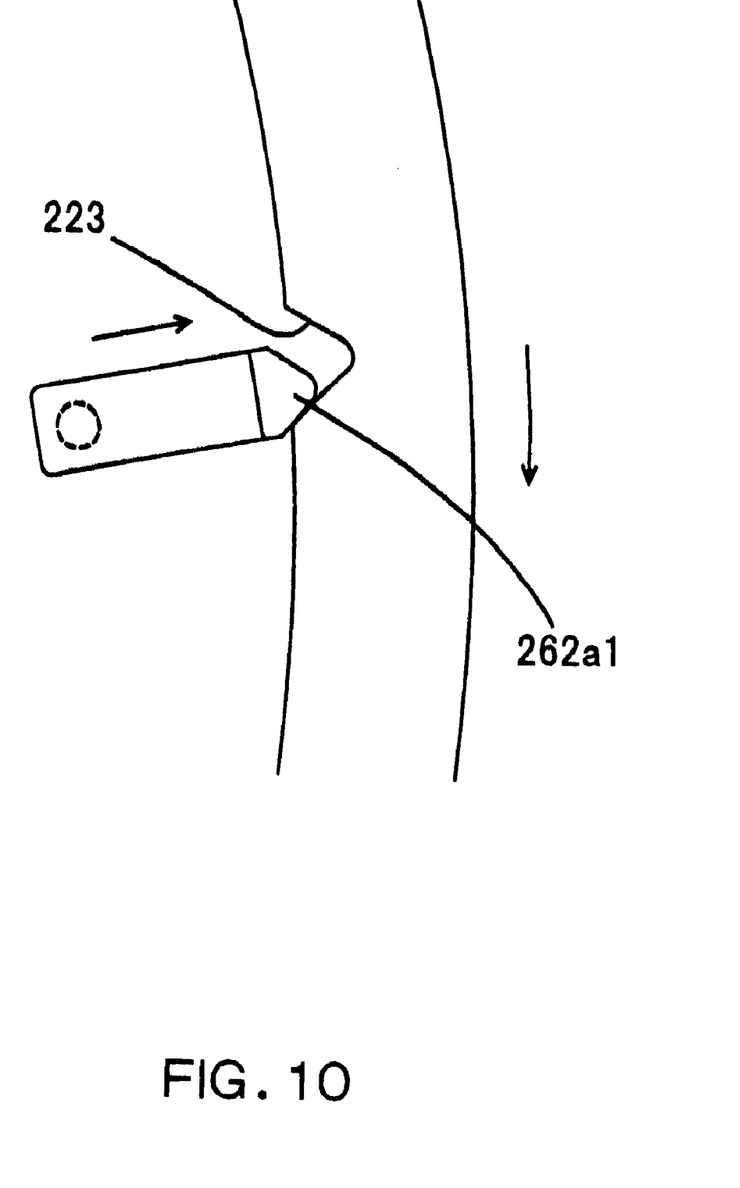
FIG. 10 is a plan view showing a state in which the engaging groove has stopped before the predetermined position.

The sharp portion 262a1 is formed with slant faces toward the tip thereof and each engaging groove 223 is formed with slant faces toward the inner part thereof, so even if the rotary tray 220 stops beyond or before a predetermined position, it is possible to correct the stopped position of the rotary tray 220 while allowing the respective slant faces to confront each other and hence possible to guide the tip of the sharp portion 262a1 to the inner part of the engaging groove 223, as shown in FIGS. 9 and 10.

Figure 11:
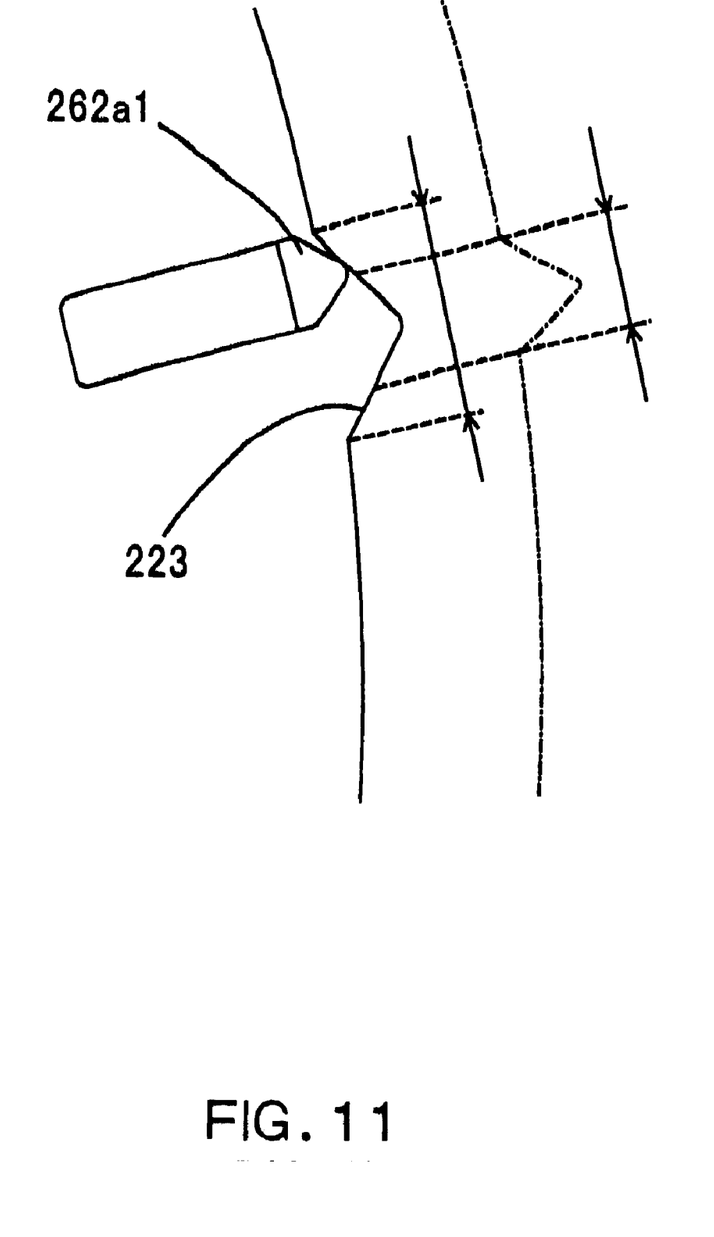
FIG. 11 is a plan view showing a construction of an engaging groove according to a modification.

In this embodiment the width of the sharp portion 262a1 and the width in the circumferential direction of each engaging groove 223 are set almost equal to each other. But, as shown in FIG. 11, the circumferential width of each engaging groove 223 may be set wider, as shown in FIG. 11. In the same figure, chain lines represent such a shape of the engaging groove 223.

With such a larger circumferential width of each engaging groove 223, even in the event of a larger deviation of the stop position, the tip of the sharp portion 262a1 can be surely guided to the inner part of the engaging groove 223 while allowing the slant faces of both sharp portion and engaging groove to confront each other.

(5) Mechanical Holder

Figure 12:
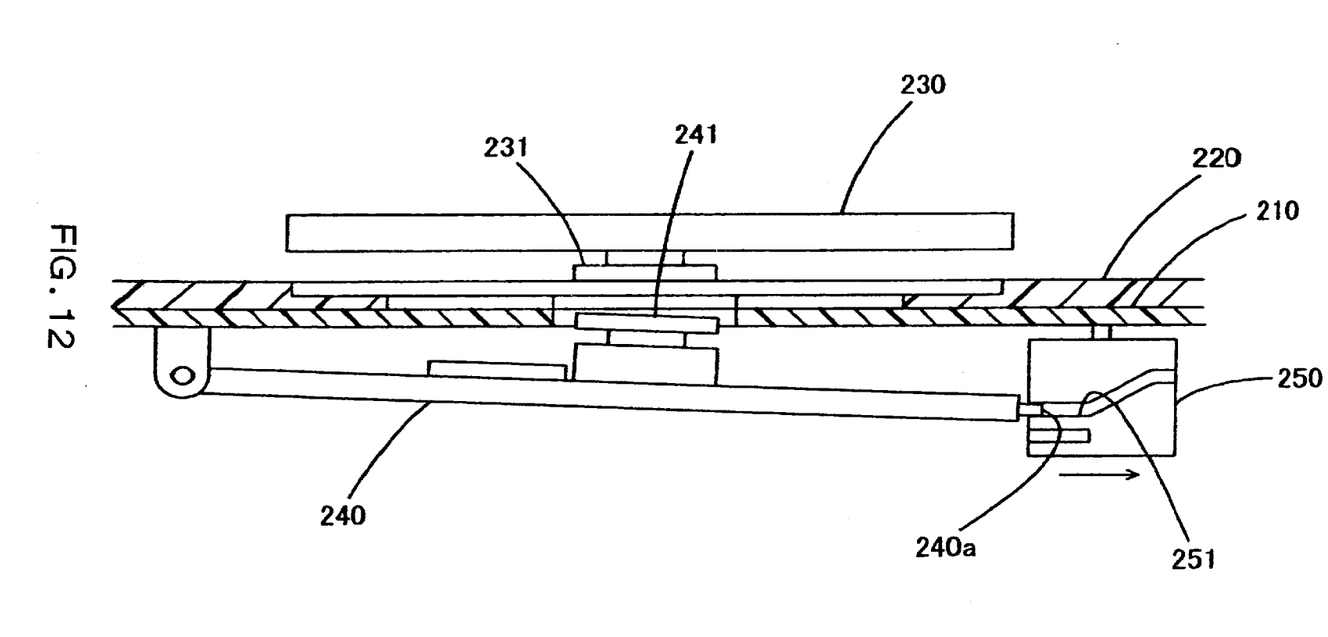
FIG. 12 is a side view showing a state before rise of a mechanical holder.
Figure 13:
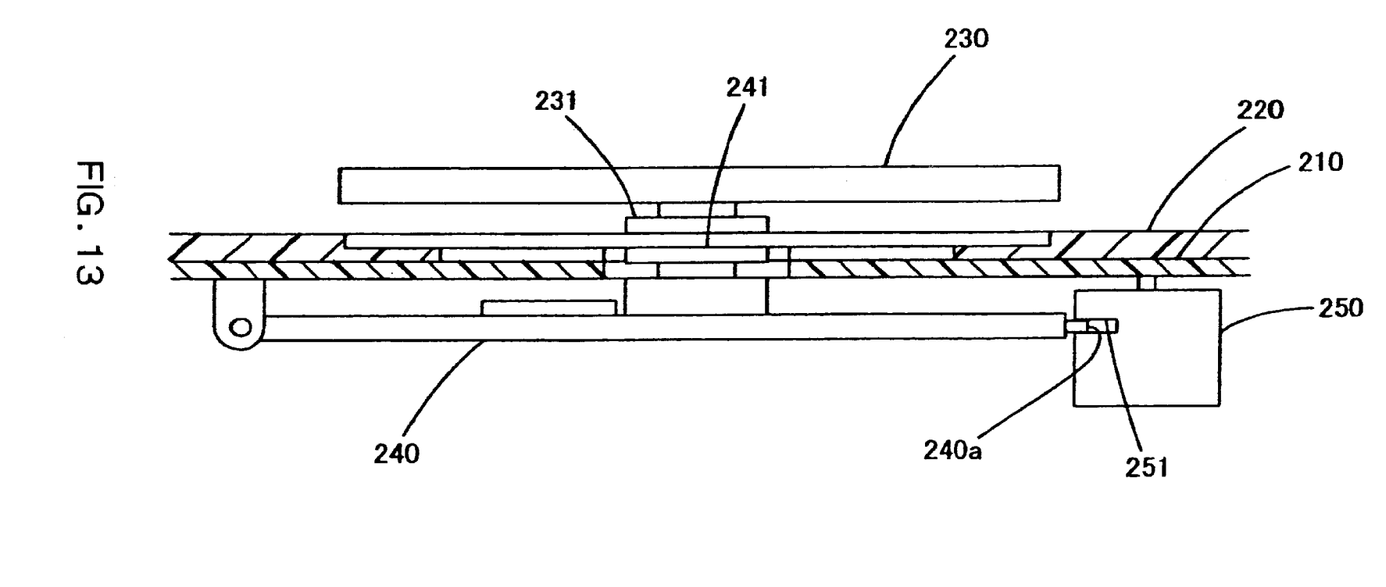
FIG. 13 is a side view showing a state in which the mechanical holder has risen and performed a chucking motion.

FIG. 12 illustrates a before-rise state of the mechanical holder 240 in terms of a side view and FIG. 13 illustrates a chucking state after rise of the mechanical holder 240 in terms of a side view.

As shown in both figures, one end of the mechanical holder 240, which is generally in the shape of a rectangular case, is pivotally connected to the lower surface of the slide tray 210, and a rib 240a projecting substantially horizontally from an opposite end of the mechanical holder 240 is inserted into the cam groove 251 of the motion gear 250.

As shown in FIG. 4, the cam groove 251 extends from a first horizontal portion 251a spaced apart from the slide tray 210 to a second horizontal portion 251c close to the slide tray 210 through an inclined portion 251b. When chucking is performed, the rib 240a is guided from the right to the left side in the same figure.

According to this construction, as shown in FIG. 12, while the rib 240a is guided along the first horizontal portion 251a during chucking, the whole of the mechanical holder 240, so that the second chucking portion 241 and the pickup are spaced apart from the through hole 213. Then, while the rib 240a is guided along the inclined portion 251b and moves toward the slide tray 210, the whole of the mechanical holder 240 approaches a horizontal state as indicated with arrow in the same figure.

When the rib 240a reaches the second horizontal portion 251c, as shown in FIG. 13, the whole of the mechanical holder 240 assumes a horizontal state and the second chucking portion 241 chucks a disk on the rotary tray 220 which has been established its position, while pressing the rotational axis of the disk against the first chucking portion 231. Then, the second chucking portion 241 is rotated by means of a spindle motor (not shown) which is mounted on the mechanical holder 240, whereby the disk is rotated and stored data are read by the pickup.

Thus, upon a counterclockwise displacement of the arm portion 261b, the shaft portion 262b of the rotary stopper 262 moves toward an engaging groove 223, so that the sharp portion 262a1 is inserted into the engaging groove 223. At this time, the slant faces formed on both sides of the tip of the sharp portion 262a1 are guided along the slant faces of the engaging groove 223 and are inserted into the inner part of the engaging groove.

Therefore, even if the rotary tray 220 stops at a position deviated from the predetermined rotational position, it is possible to surely inhibit the rotation of the rotary tray 220.

We claim:

1. A disk changer comprising:
    a slide tray with a support shaft erected on an upper surface thereof, the slide tray being installed so that it can be drawn out from a cabinet body;
    a disk tray having on an upper surface thereof a plurality of disk receptacle portions which can receive disks therein, the disk tray having on a lower surface thereof an outwardly formed engaging groove having a deep part defined by radial wedge-like slant faces, the disk tray having an axis at which it is supported rotatably by the support shaft of the slide tray;
    a chuck arm having one end mounted to an upper end of the support shaft of the slide tray and having on an opposite end side thereof a first chucking portion which can confront each of the disk receptacle portions from above;

a drive unit for rotating the disk tray;

a position sensor for detecting a rotational position of the disk tray;

a mechanical holder which carries thereon a second chucking portion and a pickup both able to confront each of the disk receptacle portions from below, the mechanical holder being able to let the second chucking portion and the pickup move toward and away from each of the disk receptacle portions on a lower surface of the slide tray;

a lock mechanism provided with a rotary stopper, the rotary stopper having at one end thereof a sharp portion capable of being inserted into the engaging groove of the disk tray from inside to outside in the radial direction; and a motion gear functioning as a rotary cam to rotate in reference to a position detected by the position sensor, the motion gear which, when the position sensor detects a predetermined rotational position of the disk tray, causes the sharp portion of the rotary stopper in the lock mechanism to be inserted into the engaging groove to inhibit the rotation of the disk tray, and causes the second chucking portion and the pickup in the mechanical holder to rise toward the associated disk receptacle portion, allowing a rotational axis of the disk received therein to be held between the first and second chucking portions.

2. A disk changer comprising:

a disk tray of a generally disk shape, the disk tray being able to receive plural disks on a surface thereof and having an outwardly formed engaging groove having a deep part defined by radial wedge-like slant faces in a position spaced apart from a rotational axis thereof;

a drive mechanism for rotating the disk tray; and a position sensor for detecting a rotational position of the disk tray;

a lock mechanism provided with an engaging member, the engaging member having at one end thereof a sharp portion capable of being inserted into the engaging groove from inside to outside in the radial direction; and a motion gear functioning as a rotary cam to rotate in reference to a position detected by the position sensor, the motion gear which, when the position sensor detects a predetermined rotational position of the disk tray, causes the sharp portion of the engaging member of the lock mechanism to be inserted into the engaging groove to inhibit the rotation of the disk tray.

3. A disk changer according to claim 2, wherein the engaging groove of the disk tray is formed wider than the width of the sharp portion of the engaging member in the circumferential direction of the disk tray.

4. A disk changer according to claim 2, wherein the disk tray has the engaging groove in a position close to a peripheral edge portion of the disk tray.

5. A disk changer according to claim 2, wherein:

the sharp portion of the engaging member is formed on one end side of the engaging member and an axis of the engaging member is oriented in the rotational axis direction of the disk tray;

the disk tray pivotally supports one end side of a mechanical holder, the mechanical holder having a pickup able to confront each of the disks received on the disk tray; and wherein the rotary cam includes a first cam groove into which an opposite end side of the engaging member is inserted and which causes the opposite end side of the engaging member to move forward and backward with respect to a radial direction of the disk tray, and a second cam groove into which an opposite end side of the mechanical holder is inserted and which causes the opposite end side of the mechanical holder to move up and down with respect to a rotational surface of the disk tray, the rotary cam, when rotating in a predetermined direction, causing the opposite end side of the engaging member to be guided and rotated by the first cam groove in a direction in which the sharp portion of the engaging member approaches the engaging groove, while causing the opposite end side of the mechanical holder to be moved by the second cam groove in a direction in which the opposite end side of the mechanical holder approaches the rotational surface of the disk tray.

* * * * *